United States Patent [19]

Rapp et al.

[11] Patent Number: 4,491,567

[45] Date of Patent: Jan. 1, 1985

[54] MANUFACTURE OF HYDROXYLAMMONIUM SALTS

[75] Inventors: Günther Rapp, Ludwigshafen; Erwin Thomas, Freinsheim; Rolf Muenster, Speyer, all of Fed. Rep. of Germany; Brodus E. Caffall, Lake Jackson, Tex.; Philip A. Cyr, Lake Jackson, Tex.; Thomas M. Jones, Lake Jackson, Tex.

[73] Assignee: BASF Aktiengesellschaft, Fed. Rep. of Germany

[21] Appl. No.: 481,000

[22] Filed: May 31, 1983

Related U.S. Application Data

[63] Continuation of Ser. No. 325,769, Nov. 30, 1981, abandoned, which is a continuation of Ser. No. 942,998, Sep. 18, 1978, abandoned.

[30] Foreign Application Priority Data

Sep. 27, 1977 [DE] Fed. Rep. of Germany ....... 2743324

[51] Int. Cl.$^3$ ............................................. C01B 21/20
[52] U.S. Cl. .................................................... 423/387
[58] Field of Search ............................... 423/387, 388

[56] References Cited

FOREIGN PATENT DOCUMENTS 712467 7/1954 United Kingdom ................ 423/387

OTHER PUBLICATIONS

"Huntington Alloys" Publication.

Primary Examiner—John Doll
Assistant Examiner—Wayne A. Langel
Attorney, Agent, or Firm—Keil & Weinkauf

[57] ABSTRACT

Hydroxylammonium salts are manufactured by a process comprising the catalytic reduction of nitric oxide with hydrogen in a dilute aqueous mineral acid in the presence of a suspended platinum catalyst at an elevated temperature, wherein the reaction is carried out in vessels of which the walls consist of conventional copper-containing austenitic chromium-nickel steels which contain from 16 to 28% by weight of chromium, from 32 to 50% by weight of nickel, from 1 to 4% by weight of molybdenum, up to 4% by weight of copper and at most 0.1% by weight of carbon and which in addition contain an amount of titanium which is at least 5 times the amount of carbon but is not more than 1% by weight, or an amount of niobium or tantalum which is at least 8 times the amount of carbon but is not more than 1.5% by weight.

4 Claims, No Drawings

MANUFACTURE OF HYDROXYLAMMONIUM SALTS

This application is a continuation of Ser. No. 325,769, filed Nov. 30, 1981, abandoned, which was a continuation of Ser. No. 942,998, filed Sept. 18, 1978, abandoned.

The present invention relates to a process for the manufacture of hydroxylammonium salts by catalytically reducing nitric oxide with hydrogen in a dilute aqueous mineral acid in the presence of a suspended platinum catalyst at an elevated temperature, in which the reaction is carried out in vessels made of particular materials of construction.

In the manufacture of hydroxylammonium salts by catalytically reducing nitric oxide with hydrogen in a dilute aqueous mineral acid in the presence of a suspended platinum catalyst at an elevated temperature, a problem arises in that the acid reducing reaction mixture is extremely corrosive, and there is only a limited selection available of materials of construction which have sufficient resistance to corrosion. Plastics, eg. polyvinyl chloride, polyethylene, polypropylene or polytetrafluoroethylene, and synthetic and natural rubbers, have proved suitable. Equipment lined with enamel or graphite, or with platinum or tantalum, has also proved suitable for use with corrosive media of this kind. The disadvantages of using these materials for constructing the reactor are on the one hand their high cost and the difficulty of processing the materials, and on the other hand unsatisfactory properties such as fragility, embrittlement on aging, sensitivity to impact and shock, and low mechanical strength. These properties make it particularly difficult to construct reactors for the manufacture of hydroxylammonium salts if the synthesis is to be carried out under pressure.

A number of commercial steel alloys of high mechanical strength and good corrosion resistance have also proved unsatisfactory for use in conjunction with the synthesis of hydroxylamine by catalytically reducing nitric oxide in an aqueous mineral acid. Chromium-nickel steels with added titanium (material 1.4541) undergo corrosion under the effect of the reducing strongly acid aqueous reaction medium. Other chromium-nickel steels with added molybdenum, which additionally contain copper and are particularly resistant to dilute sulfuric acid under normal conditions of use, such as material 1.4505, also exhibit corrosion phenomena.

Corrosion also reduces the life of the steels. However, a particular disadvantage is the adverse effect, on the course of the reaction, of the constituents of the metal alloys which pass into solution.

It is an object of the present invention to provide a method for the manufacture of hydroxylammonium salts by reducing nitric oxide with hydrogen in an acid medium, wherein the reaction is carried out in vessels which are virtually non-corroding, are insensitive to impact and shock, are resistant to aging, are readily processable and possess high mechanical strength so that the reaction can also be carried out under superatmospheric pressure.

We have found that this object is achieved by providing a process for the manufacture of hydroxylammonium salts which comprises the catalytic reduction of nitric oxide with hydrogen in a dilute aqueous mineral acid in the presence of a suspended platinum catalyst at an elevated temperature, wherein the reaction is carried out in vessels of which the walls consist of conventional copper-containing austenitic chromium-nickel steels which contain from 16 to 28% by weight of chromium, from 32 to 50% by weight of nickel, from 1 to 4% by weight of molybdenum, up to 4% by weight of copper and at most 0.1% by weight of carbon and which in addition contain an amount of titanium which is at least 5 times the amount of carbon but is not more than 1% by weight, or an amount of niobium or tantalum which is at least 8 times the amount of carbon but is not more than 1,5% by weight.

The process of the invention has the advantage that the materials used possess excellent resistance to corrosion by the reaction medium and do not release any materials detrimental to the course of the reaction into the said medium. Furthermore, the materials used are insensitive to aging, impact and shock and have excellent mechanical strength, good processability and a long life.

The starting material is as a rule a mixture of hydrogen and nitric oxide in which the molar ratio of hydrogen to nitric oxide is $>1$, preferably from 1.5:1 to 6:1. Particularly good results are obtained by maintaining a molar ratio of hydrogen to nitric oxide of from 3.5:1 to 5:1 in the reaction zone.

In general, the mineral acid used as a non-reducing strong mineral acid, eg. perchloric acid, nitric acid, sulfuric acid or phosphoric acid. Acid salts of these, eg. ammonium bisulfate, may also be used. The use of sulfuric acid is particularly preferred. As a rule, the aqueous acid is initially from 4N to 6N and is not allowed to fall below 0.2N in the course of the reaction.

The reaction is advantageously carried out at from 30° to 80° C., more particularly at from 40° to 60° C. As a rule, the reaction is carried out under atmospheric pressure or superatmospheric pressure, eg. at up to 300 bar.

The platinum catalyst used is in general a supported catalyst. Platinum on a carbon carrier, especially on graphite, has proved particularly suitable. The catalyst is employed in a finely divided form, as a suspension. Preferably, the catalyst contains from 0.2 to 5% by weight of platinum. Advantageously, it additionally contains one or more elements of groups 5 and/or 6 of the periodic table, having an atomic weight of $>31$, as well as lead and/or mercury as a catalyst poison. Suitable catalysts and their manufacture are described, for example, in German Published Application DAS No. 1,088,037 and in German Pat. Nos. 920,963, 956,038 and 945,752.

The reaction is carried out in vessels of which the walls consist of conventional copper-containing austenitic steels which contain from 16 to 28% by weight of chromium, from 32 to 50% by weight of nickel, from 1 to 4% by weight of molybdenum, up to 4% by weight of copper and at most 0.1% by weight of carbon. The remainder is of course iron. According to the invention, copper-containing means that copper has been added to the alloys as an alloying metal. Furthermore, the steels used also contain an amount of titanium which is at least 5 times the amount of carbon but is not more than 1% by weight, or an amount of niobium or tantalum which is at least 8 times the amount of carbon but is not more than 1.5% by weight. A steel containing from 18 to 25% by weight of chromium, from 34 to 45% by weight of nickel, from 1.5 to 3.5% by weight of molybdenum, from 1.5 to 3.5% by weight of copper, from 0.01 to 0.07% by weight of carbon and from 0.8 to 1.0% by weight of titanium or from 0.6 to 0.9% by weight of niobium, by way of non-ferrous constituents, has proved to be particularly suitable. The steels may in addition contain small amounts of impurities, which are inevitably introduced if the steel is manufactured from scrap iron.

The term reaction vessel is to be interpreted in its broadest sense. It not only encompasses the walls of the actual vessel but also the accessory pipelines, pumps, condensers and stirrers, ie. all walls which come into contact with the reaction mixture should consist of the material according to the invention. The steel alloys according to the invention possess all the advantages of austenitic alloy steels for equipment construction, eg. they can be cast and shaped, are easily processable and can be welded, in each case using conventional techniques. Their high mechanical strength permits their use as a material for high-pressure reactors. Their decisive advantage, in addition to their attractive price, is their high resistance to corrosion by the reducing strongly acid aqueous reaction medium. It is surprising that the synthesis of hydroxylamine proves trouble-free after the walls of the vessel have been exposed to attack by the reaction medium, under the reaction conditions, for about 200 hours. The passivation thus achieved has not been achievable hitherto by other, conventional, passivating agents.

Hydroxylammonium salts manufactured by the process of the invention can be used for the manufacture of cyclohexanone-oxime, a caprolactam intermediate. The Examples which follow illustrate the invention.

COMPARATIVE EXAMPLES 1 AND 2 AND EXAMPLES 1 TO 3

Four reaction vessels connected in series are each filled with 6,000 liters of 4.5N sulfuric acid and 150 kg of a platinum-graphite catalyst containing 1% by weight of platinum. With the connecting lines closed the contents of the reaction vessels are exposed to a hydrogen/nitric oxide mixture, in the molar ratio of 1.7:1, so as to result in the following concentration of free sulfuric acid in the individual reaction vessels.

| Reactor 1 | 3.2 N |
| Reactor 2 | 2.0 N |
| Reactor 3 | 0.95 N |
| Reactor 4 | 0.3 N |

The connecting lines between the individual reaction vessels are now opened and 20% strength by weight sulfuric acid together with platinum catalyst is introduced into reactor 1 and passed through the reactors to a separating unit. The catalyst separated from the hydroxylammonium sulfate solution formed is returned to reaction vessel 1. At the same time, a mixture of hydrogen and nitric oxide of the above composition is passed in parallel through reactors 4, 3 and 2. The off-gases from these reactors are collected and are conjointly passed through reactor 1. This gives 380 kg/h of hydroxylamine in the form of a hydroxylammonium sulfate solution, the yield of hydroxylamine being 93.5% based on nitric oxide converted.

Samples of various types of stainless steel are introduced into the first reaction vessel and exposed to the reaction medium for 8 months. After withdrawing the samples, their annual surface wear is calculated from the length of exposure and the weight loss, taking into account the exposed surface and the density. The results are shown in the Table which follows.

| Material | Material No. | C | Cr | Ni | Mo | Cu | Ti | Nb | Yearly wear (mm) |
|---|---|---|---|---|---|---|---|---|---|
| Comparative Example 1 | 1.4541 | 0.07 | 18 | 10.5 | — | — | 0.45 | — | almost dissolved |
| Example 1 | | 0.05 | 19.6 | 34.6 | 2.5 | 3.3 | — | 0.8 | 0.10 |
| Example 2 | | 0.03 | 20.4 | 37.4 | 2.0 | 3.3 | — | 0.7 | 0.08 |
| Example 3 | | 0.05 | 21 | 42 | 3.0 | 2.0 | 0.9 | — | 0.07 |
| Comparative Example 2 | 1.4505 | 0.05 | 18 | 20 | 2.25 | 2.0 | — | 0.63 | 0.47 |

EXAMPLE 4

The procedure described for Example 1 is followed, but 6.5% of the exposed material surface in the equipment of the first reactor is replaced by a steel containing 37.4% by weight of nickel, 20.4% by weight of chromium, 2.0% by weight of molybdenum, 3.3% by weight of copper, 0.7% by weight of niobium and 0.03% by weight of carbon. After continuous operation for 4 years, no wear is detectable and there is no effect on the synthesis of hydroxylamine.

We claim:

1. A process for the manufacture of hydroxylammonium salts comprising the catalytic reduction of nitric oxide with hydrogen in a dilute aqueous mineral acid in the presence of a suspended platinum catalyst at an elevated temperature, wherein the reaction is carried out in vessels of which the walls consist of conventional copper-containing austenitic chromium-nickel steels consisting of from 16 to 28% by weight of chromium, from 32 to 50% by weight of nickel, from 1 to 4% by weight of molybdenum, from 2.0 to 3.3% by weight of copper and at most 0.1% by weight of carbon, and an amount of titanium which is at least 5 times the amount of carbon but is not more than 1% by weight, or an amount of niobium or tantalum which is at least 8 times the amount of carbon but is not more than 1.5% by weight, the remainder being iron and natural impurities; said steels having been exposed to the reaction medium for about 200 hours, whereby they are passivated and release no materials detrimental to the course of reaction on exposure to the process.

2. A process for the manufacture of hydroxylammonium salts; which comprises the catalytic reduction of nitric oxide with hydrogen, at a beginning mole ratio of 1.5:1 to 6:1 hydrogen to nitric oxide in the reaction zone, in a dilute aqueous mineral acid in the presence of a suspended platinum catalyst at an elevated temperature; wherein the reaction is carried out in vessels of which the walls consist of conventional copper-containing austenitic chromium-nickel steel alloys which contain from 16 to 28% by weight of chromium, from 32 to 50% by weight of nickel, from 1 to 4% by weight of molybdenum, from 2.0 to 3.3% by weight of copper and at most 0.1% by weight of carbon, and which in addition contain an amount of titanium which is at least 5 times the amount of carbon but is not more than 1% by weight, or an amount of niobium or tantalum which is at least 8 times the amount of carbon but is not more than 1.5% by weight, said alloys having been exposed to the reaction medium for about 200 hours whereby they are passivated and adverse effects on the reaction by constituents of said alloy being released into solution through corrosion are avoided.

3. The process of claim 2 wherein the chromium-nickel steel alloys contain from 18 to 25% by weight of chromium, from 34 to 45% by weight of nickel, from 1.5 to 3.5% by weight of molybdenum, from 1.5 to 3.5% by weight of copper, from 0.01 to 0.07% by weight of carbon and 0.8 to 1.0% by weight of titanium or from 0.6 to 0.9% by weight of niobium and wherein the beginning mole ratio of reactants is from 3.5:1 to 5:1 hydrogen to nitric oxide in the reaction zone.

4. The process of claim 1, wherein all accessory equipment which comes into contact with the reaction mixture consists of the alloy recited for the walls of said reaction vessel.

* * * * *